(No Model.)
C. CURTIS & N. M. JONES.
PAPER PULP DIGESTER.
No. 485,810. Patented Nov. 8, 1892.
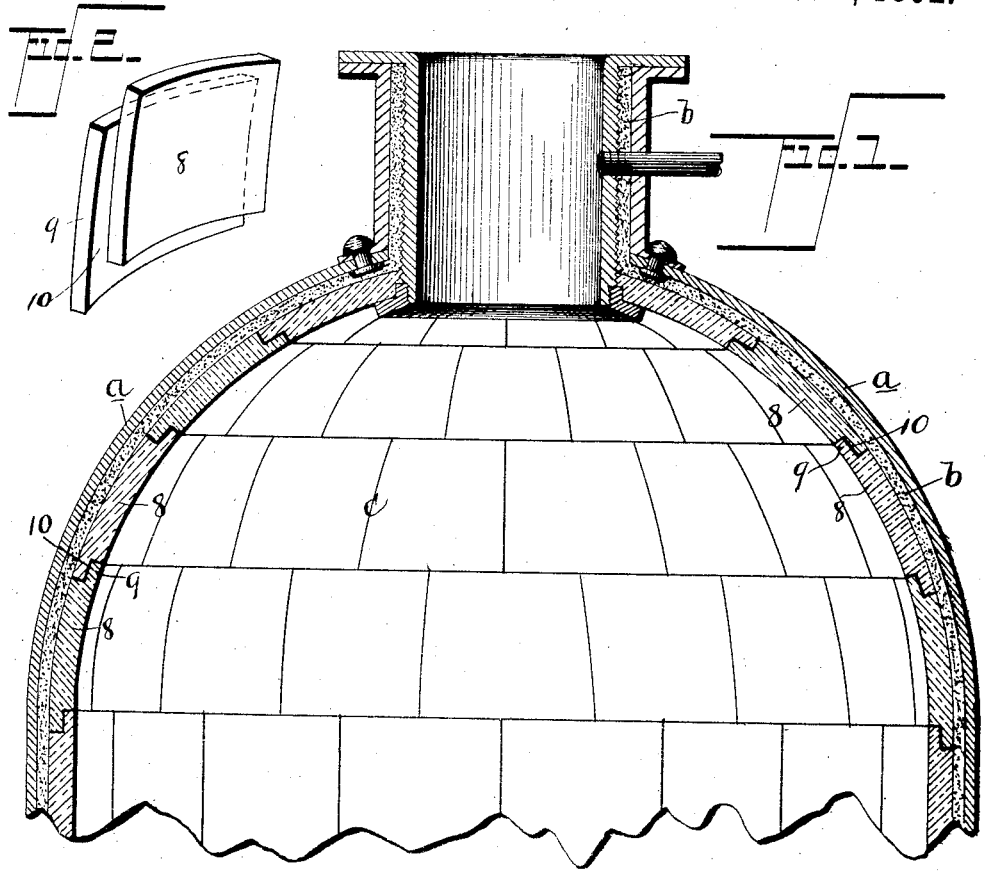
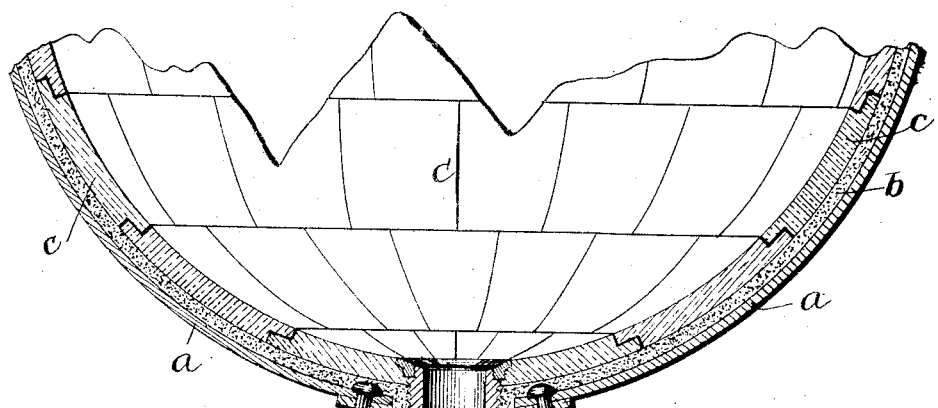
Witnesses
H. G. Seitz
P. W. Harrison
Inventors
Charles Curtis
Nathaniel M. Jones,
by Wright, Brown & Quimby
their Attorneys.

UNITED STATES PATENT OFFICE.

CHARLES CURTIS, OF NEWTON, MASSACHUSETTS, AND NATHANIEL M. JONES, OF BANGOR, MAINE.

PAPER-PULP DIGESTER.

SPECIFICATION forming part of Letters Patent No. 485,810, dated November 8, 1892.

Application filed September 26, 1892. Serial No. 446,901. (No model.)

*To all whom it may concern:*

Be it known that we, CHARLES CURTIS, of Newton, in the county of Middlesex and State of Massachusetts, and NATHANIEL M. JONES, of Bangor, in the county of Penobscot and State of Maine, have invented certain new and useful Improvements in Paper-Pulp Digesters, of which the following is a specification.

This invention relates to digesters for cooking wood chips in the manufacture of paper-pulp, and has for its object to provide such a construction as will protect the metal shell of the digester against the acid solutions employed to dissolve the resins and gums of the wood.

To these ends the invention consists, mainly, in a digester comprising an external shell or casing of metal and a lining composed of compressed carbonized cement or artificial stone.

Of the accompanying drawings, forming a part of this specification, Figure 1 represents a vertical section of a digester embodying our invention, the central portion being broken away. Fig. 2 represents a perspective view of one of the blocks.

The same letters of reference indicate the same parts in both the figures.

In the drawings, *a* represents the shell of the digester, which is preferably of cylindrical form and composed of any suitable metal, such as iron, steel, phosphor-bronze, brass, &c.

*b* represents an intermediate lining, which is preferably composed of asbestus and cement made into a plastic composition and applied to the inner surface of the shell in a plastic state, its object being to protect the inner cement lining hereinafter described and to prevent contact of the acid solution with the metal shell in the event of leakage through the cement lining.

*c* represents the cement lining, which is composed, preferably, of Portland cement and ground glass or quartz, with or without a percentage of soluble glass. We do not limit ourselves to this composition, however, and may use any other cement or composition. The cement is carbonized by the absorption of carbonic-acid gas, and is thus converted into an artificial stone and rendered extremely hard and durable, so that it is particularly adapted for use as a digester lining, it being impervious to the acid and comparatively free from liability to crack and chip.

We show the cement lining as constructed in sections 8 8, which are provided at their edges with tongues 9 and recesses 10, the tongues of each section entering the recesses of the adjacent section, so that the sections overlap at their joints. The sections or blocks are formed in suitable flasks or molds, the ingredients of the cement being inserted in the molds and subjected to sufficient pressure therein before the setting of the cement to make the blocks uniformly dense and free from pores or air-holes. The compression of the cement is an important part of our invention and prevents liability of the acid solution working its way through the blocks, which liability would exist to a greater or less extent if the blocks were simply formed without compression.

It will be seen that the lining of carbonized cement, being extremely hard and dense, is well adapted not only to resist the acid solution, but also the heat which is used in cooking the wood chips, preventing both the acid and the heat from reaching the shell of the digester, while the intermediate lining *b* constitutes a safeguard or protection for the metal shell against the action of the acid solution in the event of cracking of the cement.

We do not claim, broadly, the process of carbonizing cement by subjecting the same to carbonic-acid gas; but we are the first, so far as we are aware, to provide a metal shell with a lining of carbonized cement.

We do not limit ourselves in all cases to the use of the intermediate lining *b*, and may place the cement lining directly against the inner surface of the metal shell, or may interpose between the inner cement lining and shell only a coating of cement.

We are aware that digester-shells have been lined with glazed or vitrified tiles and with porcelain tiles; but we make the following broad distinctions between a carbonized-cement lining and a lining of glazed or vitrified and porcelain tiles, viz: First, carbonized cement is homogeneous and has substantially the same coefficient of expansion and contraction as iron and steel, so that when the digester is opened and cooled internally after the discharge of its contents the lining and shell contract alike and there is no liability of the shell contracting more rapidly than the lining, and thus exerting an injurious compressive strain on the lining. On the other hand, a lining of glazed or vitrified tile or of porcelain tile will contract more slowly than the metal shell, so that there would be a pressure on the lining tending to crack and chip off its inner surface; secondly, carbonized cement is more elastic than glazed or vitrified tile and porcelain tile, so that it is not so easily broken. We are also aware that it is not new to provide a boiler or a digester-shell with a continuous lining of cement applied in a plastic state to the interior of the shell. Such lining has never been carbonized, however, prior to our invention, and therefore differs from our lining in that it is much more brittle and liable to crack and chip off. An objection to a continuous cement lining applied in a plastic state is that it is impossible to make the lining of uniform density. Hence it is often defectively porous in spots, and thus liable to be permeated by the acid. Our lining is made of previously-molded blocks, the material of which is subjected to pressure during the molding operation, so that there is no difficulty in making all the blocks of uniform density and strength, the inherent strength of the cement being increased by carbonization.

The advantages due to the compression of the cement are not wholly dependent on the carbonization of the cement, although the latter is a very important feature. We therefore desire to cover a lining of compressed cement whether carbonized or not.

We claim—

1. The improved pulp-digester herein described, comprising in its construction a metal shell and a lining composed of compressed carbonized cement, as set forth.

2. The improved pulp-digester herein described, comprising in its construction a metal shell and a lining composed of compressed cement, as set forth.

In testimony whereof we have signed our names to this specification, in the presence of two subscribing witnesses, this 8th day of September, A. D. 1892.

CHARLES CURTIS.
NATHANIEL M. JONES.

Witnesses:
C. F. BROWN,
KATHARINE E. BROWN.